March 28, 1950
J. F. FROLA
2,501,717
MEASURING APPARATUS FOR LOAD COMPENSATING
FLUID PRESSURE BRAKE EQUIPMENT
Filed March 10, 1948
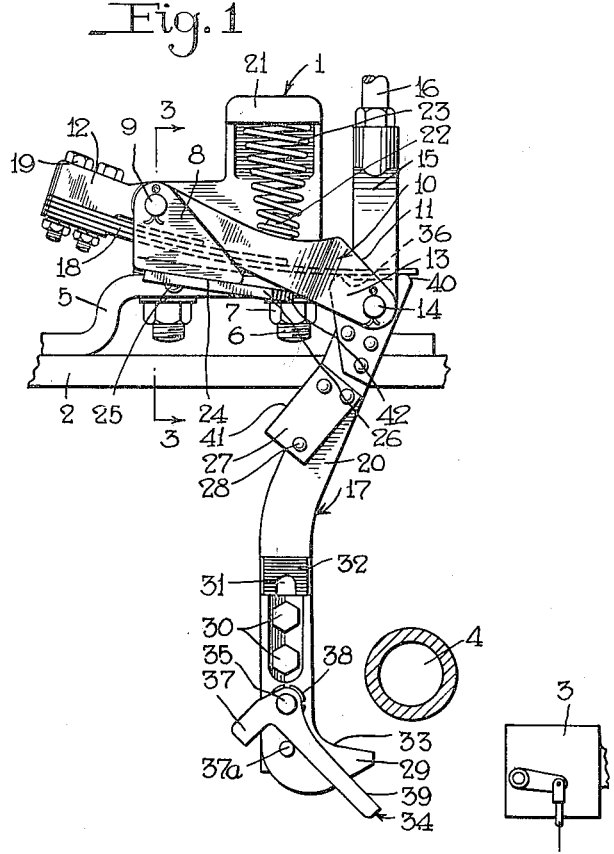
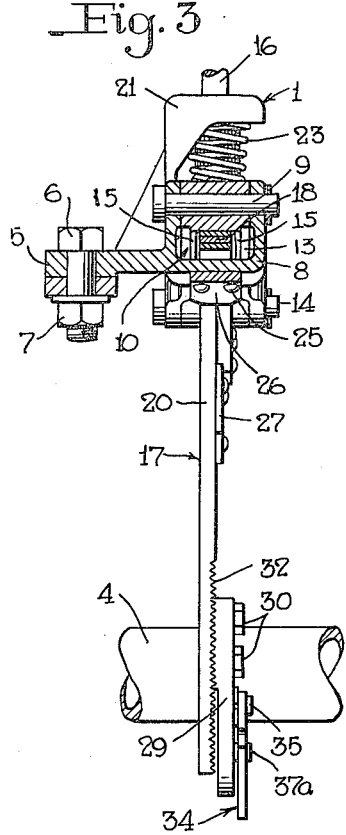
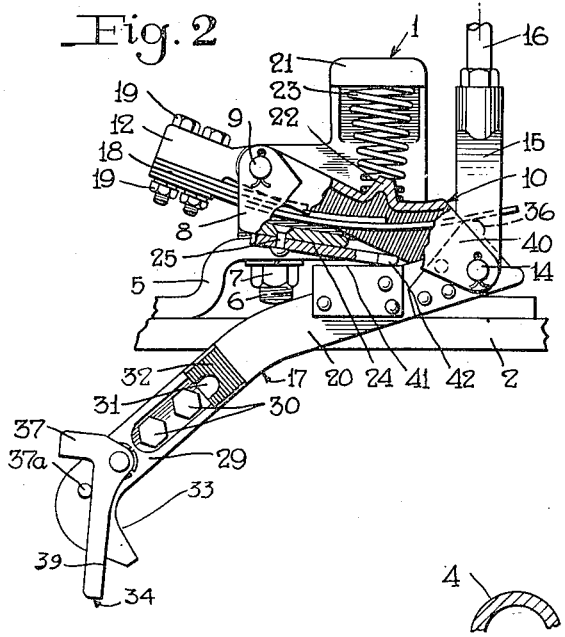
INVENTOR.
Joseph F. Frola
BY
Frank E. Miller
ATTORNEY Patented Mar. 28, 1950

2,501,717

UNITED STATES PATENT OFFICE 2,501,717

MEASURING APPARATUS FOR LOAD COMPENSATING FLUID PRESSURE BRAKE EQUIPMENT

Joseph F. Frola, Braddock, Pa., assignor to The Westinghouse Air Brake Company, Wilmerding, Pa., a corporation of Pennsylvania Application March 10, 1948, Serial No. 13,994

11 Claims. (Cl. 303—22)

This invention relates to apparatus for conditioning load compensating brake equipment for railway vehicles and more particularly to that portion thereof which measures the variable vertical distance between a sprung portion and an unsprung portion of the vehicle to condition the brake apparatus for operation to vary the degree of a brake application on the vehicle according to variations in the weight of the load carried by the vehicle.

The principal object of this invention is to provide, in a measuring apparatus of the type embodying a measuring leg such as shown and described in the copending patent application by Arthur J. Bent, Serial No. 787,014, filed November 19, 1947, and assigned to the assignee of the present invention, means for automatically returning said leg to a normal vertical position for measuring operation after having previously been placed in an inoperative horizontal position to avoid interference with the operation of removing a truck associated therewith from a car.

Other objects and advantages will appear in the following more detailed description of the invention.

In the accompanying drawing, Fig. 1 is a side elevational view of a measuring apparatus embodying the invention and which is associated with a load compensating brake mechanism in a manner set forth in the aforementioned application; Fig. 2 is a similar view of the measuring apparatus showing the leg in its inoperative position, and Fig. 3 is an end elevational view of a portion of the same, partly in section taken on the line 3—3 of Fig. 1.

Description

As in the aforesaid patent application, the measuring apparatus 1, constructed in accordance with the invention, is adapted to be mounted on a portion 2 of the spring supported body of the vehicle and operated by a load compensating valve mechanism 3 (Fig. 2). The vehicle body may be of the passenger, freight or tender type and the trucks for carrying the same may each be of any desired construction and, since these parts are not essential to a clear understanding of the invention, they are not shown in the drawings. Likewise, a transverse stop member, indicated by the reference character 4 is mounted on an unsprung part of a vehicle truck.

For supporting the measuring apparatus 1 of this invention in a desirable position a member 5 is provided which is secured to the body portion 2 by any suitable means such as welding. Secured to the member 5 by means of bolts 6 and cooperatively associated nuts 7 is a bracket 8 which operatively supports the measuring apparatus.

Journaled in the supporting bracket 8 is a pivot pin 9 upon which a lever 10 is operatively mounted. The lever 10 comprises an arm 11 extending to the right of the pivot pin 9 and an arm 12 extending to the left of the pivot pin 9, as viewed in Fig. 1.

The arm 11 is formed in an approximately inverted U-shaped cross section and terminates at its right hand end in a pair of ears 13 arranged in spaced relation to each other. For effecting the aforementioned operative connection between a load compensating mechanism 3 and the arm 11, a pin 14 is journaled in the ears 13 and makes a pivotal connection with a lower forked end 15 of a rod 16 which is disposed within the ears 13 with one end of a measuring leg 17 disposed within the forked end 15 of the rod 16.

The arm 12 constitutes an extension mounting for a multi-leaf spring 18, which spring aids in determining the position of the measuring leg 17 as will hereinafter appear. The outer end of the arm 12 is provided with screw-thread means 19 by which the multi-leaf spring 18 is rigidly secured at its one end to the lever 10. The spring 18 extends longitudinally through a portion of the space within the three walls of the lever 10 and through the forked end 15 of the rod 16 so that it bears down on the upper end of a portion 20 of the measuring leg 17 at each side of its pivotal connection on pin 14 so that the spring normally urges the leg to a normal position in which it is shown in Fig. 1 at one side of and out of contact with the stop member 4.

Interposed between and operatively engaging a spring seat 21, which as shown is integrally formed with the bracket 8, and a spring lug 22, which as shown is integrally formed on top of the arm 11 of the lever 10, is a spring 23 which tends to rotate the lever 10 in a clockwise direction about the pivot pin 9 toward its normal position.

In accordance with the invention, there is secured to a bottom surface 24 of the bracket 8 by any suitable means, such as rivet means 25, a striking plate or stop 26 which is provided for cooperative engagement with a wiping plate or cam 27 mounted on the upper portion 20 of the leg 17 by means of rivets 28 when, and after, the leg has been rocked in a clockwise direction to a collapsed or folded position in which it is shown in Fig. 2.

The measuring leg 17 comprises in addition to the portion 20 a contact foot 29 which may be brought into measuring engagement with the bottom of the transverse stop member 4 in a manner to be explained later. This contact foot 29 is adjustably but rigidly secured to the portion 20 by means of screw-thread means 30. By reason of a slot 31 formed in the portion 20 through which the screw-thread means 30 extends and complementary serrated faces 32 of the portion 20 and the foot 29, the overall length of the measuring leg 17 may be varied as desired by adjusting the position of the foot 29 relative to the length of the portion 20 with the screw-thread means 30 loosened, and then tightening said means. The foot 29 is provided on its upper side with a straight line, relatively narrow contact surface 33 which may be brought into contact with the bottom of the transverse stop member 4 in a manner explained more fully later.

For gaging the overall length to which the measuring leg 17 should be adjusted, a gage member 34 is rockably mounted by means of a pin 35 on the contact foot 29. Although this gage member 34 is used only when a major change in pick-up characteristics of vehicle body supporting springs is encountered, it is permanently attached to the foot 29 because it is not known where or when a major change, such as changing the trucks under a vehicle body, may take place.

*Operation*

As described in the above application, incidental to the charging of brake pipe with fluid under pressure from atmospheric pressure to some predetermined higher degree, the load compensating valve mechanism 3 is rendered operative in response to the pressure of fluid in said brake pipe to actuate the rod 16 in an upward direction, thereby causing the lever 10 to rock in a counter-clockwise direction about pivot pin 9 carrying the measuring leg 17 in an arc of a circle about the same pin. Initial movement of the lever 10 about the pin 9 brings the right-hand side of the leg 17, as viewed in Fig. 1, into engagement with the left-hand side of the transverse stop member 4.

By reason of the above mentioned lateral engagement between the leg 17 and the stop member 4, continued rocking of the lever 10 in a counter-clockwise direction imparts an upward movement to the leg 17 relative to the member 4 and causes the leg to rock in a clockwise direction about the pivot pin 14 against the force of the leaf spring 18 which maintains said leg in contact with said stop member. This movement of the leg 17 in a clockwise direction about the pin 14 causes a surface 36 at the upper left-hand corner of the portion 20, as viewed in Fig. 1, to move in an upward direction, flexing the right-hand end of spring 18 upwardly out of its normal position in which it is shown in Fig. 1.

The leg 17 continues to move upward under the operation of the load compensating valve mechanism 3 in the manner just described until brought to a stop by engagement of the contact surface 33 of the contact foot 29 with the bottom surface of the transverse member 4. While the measuring leg 17 is in this position the load compensating valve device is conditioned for braking the vehicle according to the load thereon. After the load compensating valve mechanism 3 has been so conditioned the valve mechanism will quit exerting an upward force on rod 16 and will thus permit the spring 23 to rock the lever 10 and leg 17 in a clockwise direction to a position defined by the engagement of the lever 10 with the stop 26 as shown in Fig. 1 of the drawings.

During an adjusting operation such as above described the distance that the measuring leg 17 travels in an upward direction before engaging the transverse stop member 4 is determined by an adjustment made by the use of the gage member 34 when, with the vehicle empty, the brake equipment is being installed or when a critical change to the operation of equipment occurs such as due to change in pick-up characteristics of the car body supporting springs or due to changing a truck.

To effect such adjustment screw-thread means 30 is loosened and lowered to the bottom of the slot 31, thereby lowering the contact foot 29 relative to the leg portion 20. Gage member 34 is then rotated counter-clockwise about the pin 35 from the position in which it is shown in the drawing to a position defined by an arm 37 of the gage member 34 engaging the left-hand side of a pin 37a. The gage member 34 will be held in the position thus defined by a friction washer 38. In this position an upper surface 39 of the gage member 34 is disposed in substantially parallel relation to the straight line surface 33 on the foot 29. The leg 17 as a unit is now rotated manually from the position in which it is shown in Fig. 1 of the drawing in a counter-clockwise direction about the pin 14 and against the pressure of the leaf spring 18 now acting on an upper right-hand corner 40 of the portion 20, until the right-hand side of the leg 17, as viewed in Fig. 1, engages the left-hand side of the transverse stop member 4. While the friction washer 38 is holding the gage member 34 in this position, the screw-thread means 30 is moved upwardly in the slot 31, carrying with it gage member 34, until the surface 39 thereof, now parallel to surface 33, engages the bottom surface of the stop member 4. The screw-thread means 30 is then tightened into locking engagement with the serrated portion 32. The measuring leg 17 is now adjusted on a specific empty vehicle to the proper length for operation to condition the brake equipment for braking said vehicle according to the empty or loaded condition thereof. When released from the operator's hand, the leg 17 returns under the influence of the spring 18 to the position in which it is shown in Fig. 1 and the gage member 34 may be rotated in a clockwise direction about the pivot pin 35 until the left-hand side of gage member 34 engages the right-hand side of a stop pin 37a as shown in Fig. 1.

It will be noted that although rocking of the leg 17 in a counter-clockwise direction about a pin 14 is limited by the engagement of the leg 17 with the stop member 4 as just described, rocking of the leg in the opposite direction is not so limited but may be continued to a position defined by the engagement of the wiping plate or cam 27 on portion 20 with striking plate or stop 26 on bracket 8 as shown on Fig. 2, in which position the leg 17 will not interfere with repair work on the truck. By reason of the action of the spring 18 on the corner 36, a toggle effect is imparted to the movement of the leg from the position in which it is shown in Fig. 1 to the position in which it is shown in Fig. 2. That is to say, leg 17 is rocked in a clockwise direction about the pin 14 in the usual operation of adjusting the load compensating valve mechanism 3 according to the load on the vehicle, the spring 18 acts on the corner 36 to oppose this rocking movement throughout the load-adjusting operation and when said operation is completed actuates the leg 17 to the position shown in Fig. 1. When the leg 17 is actuated manually to the collapsed or folded position shown in Fig. 2, the leg passes "dead center" of the toggle action, i. e., the line of action of spring 18 on surface 36 is shifted to the right-hand side of the axis of pin 14 for rendering said spring effective to maintain the leg 17 in the position shown in Fig. 2. It will be understood that after the repair work on the truck is completed that the leg 17 should be returned manually to the position shown in Fig. 1, and the gaging operation effected, in preparation for the next adjustment of the load compensating valve mechanism 3 according to the load on the vehicle.

Let it be assumed, however, that the repair work has been completed and that subsequent thereto the vehicle has been put into service without the repairman having manually returned the leg 17 to the position in which it is shown in Fig. 1, from which it could be actuated according to load by the load compensating valve mechanism 3. During the period of adjustment according to load, however, the rod 16 will be actuated upwardly in the usual manner causing the lever 10 to rock in a counter-clockwise direction about the pin 9 as previously described.

Upon reference to Fig. 2 it will be seen that rocking of the lever 10 in this direction will cause a surface 41 on the wiping plate 27 to be drawn across a rounded corner 42 of the striking plate 26. It will be noted that the surface 40 is disposed at an angle to the portion 20 as in the form of an inclined plane. Consequently as the surface 41 is drawn across the corner 42, the leg 17 will be caused to rock in a counter-clockwise direction about the pin 14. This movement will cause the corner 36 of the portion 20 to flex the leaf spring 18 upwardly as the corner rocks on the right-hand side of the pin 14 toward the left-hand side of said pin. This rocking movement will continue under the influence of the valve mechanism 3 acting through the medium of the rod 16 until the corner 36 has passed "dead center," after which the spring 18 will act on the corner 36 to continue the movement until the leg 17 is returnd to the position in which it is shown in Fig. 1. In this position, the leg 17 will now be in condition to cooperate with the stop member 2 and the valve mechanism 3 to effect conditioning of the brake equipment according to load during the rest of the adjusting operation, in the manner hereinbefore described.

*Summary*

It will thus be seen that by the use of this invention a structure is provided which, when the measuring leg for load compensating brake equipment is inadvertently left out of position for cooperation therewith, will automatically return said leg to a cooperative position and thus prevent the load compensating brake equipment from subsequently being inadvertently inoperative.

Having now described my invention, what I claim as new and desire to secure by Letters Patent is:

1. In a measuring mechanism for a load compensating brake apparatus, a fixed measuring stop, a measuring leg normally positioned for movement into and out of engagement with said measuring stop, said leg being movable from its normal position to an abnormal position, means for maintaining said leg in said abnormal position, and means cooperating with said leg for causing said leg to move from said abnormal position to said normal position as an incident to the measuring operation of said measuring mechanism.

2. In a measuring mechanism for a load compensating brake apparatus, a fixed measuring stop, a measuring leg normally positioned for movement into and out of engagement with said measuring stop, said leg being movable from its normal position to an abnormal position, means for maintaining said leg in said abnormal position, and a member fixed with relation to said leg and arranged to engage the leg when, with the leg in its abnormal position, the measuring operation of the measuring mechanism occurs, to cause the leg to move from its abnormal position to its normal position.

3. A measuring mechanism for a load compensating brake equipment for a railway vehicle having an unsprung part and a load carrying sprung part, comprising an arm rockably mounted at one end on said sprung part, a leg rockably mounted at one end on the opposite end of said arm and comprising at its opposite end a foot for engaging an undersurface of said unsprung part, said leg having a normal spread position relative to said arm and operable manually from said normal position to a folded position relative to said arm, resilient toggle means for urging said leg toward either of said positions and having a dead center position therebetween, a stop member for defining said folded position operative upon movement of said arm relative to said sprung part to actuate said leg past said dead center position and condition said toggle means to urge said leg toward said normal position, and means for actuating said arm.

4. A measuring mechanism for a load compensating brake equipment for a railway vehicle having an unsprung part and a load carrying sprung part comprising an arm rockably mounted at one end on said sprung part, a leg rockably mounted at one end on the opposite end of said arm and comprising a foot at its opposite end for engaging an undersurface of said unsprung part, said leg having a normal spread position relative to said sprung portion and said unsprung portion and operable manually to a folded position relative to said sprung portion, resilient toggle means for urging said leg toward either of said positions and having a dead center position therebetween, cam means included in said leg for engagement with said sprung part when in said folded position operative therefrom upon movement of said arm relative to said sprung part to cause said toggle means to urge said leg toward said normal position, and means for actuating said arm.

5. A measuring mechanism for a load compensating brake equipment for a railway vehicle having an unsprung part and a load carrying sprung part, comprising an arm rockably mounted at one end on said sprung part, a leg rockably mounted at one end on the opposite end of said arm and comprising a foot at its opposite end for engaging an undersurface of said unsprung part, said leg having a normal spread position relative to said arm and operable manually from said normal position to a folded position relative to said arm, resilient toggle means for urging said leg toward either of said positions and having a dead center position therebetween, a stop member rigidly mounted on said sprung part for defining said folded position, cam means included in said leg for engagement with said stop member when in said folded position operative therefrom upon movement of said arm away from said stop member to effect movement of said leg from said folded position to said normal position, and means for actuating said arm.

6. In a load measuring brake equipment for a railway vehicle having an unsprung part and a load carrying sprung part, a load measuring mechanism comprising an arm rockably mounted at one end on said sprung part and movable in one direction for rendering said mechanism effective, a leg rockably mounted at one end on the opposite end of said arm and comprising a foot at its opposite end for engaging an undersurface of said unsprung part upon movement of said arm in said one direction, a resilient toggle means for holding said leg in a certain spread relation to said arm in a normal position, said toggle means having an overcenter position for urging said leg toward said arm to a folded position, and cam means comprising a stop mounted on said sprung part and a cam mounted on said leg for cooperative engagement with said stop, said cam means being operative when said leg is in said folded position upon movement of said arm in said one direction to move said leg out of said folded position toward said normal position until past said overcenter position of said togle means, and means for actuating said mechanism.

7. In a load measuring brake equipment for a railway vehicle having an unsprung part and a load carrying sprung part, a load measuring mechanism comprising an arm rockably mounted at one end on said sprung part and movable in one direction for rendering said mechanism effective, a leg rockably mounted at one end on the opposite end of said arm and comprising a foot at its opposite end for engaging an under-surface of said unsprung part upon movement of said arm in said one direction, resilient toggle means for holding said leg in a certain spread relation to said arm in a normal position, said toggle means having an overcenter position for urging said leg toward said arm to a folded position, a stop mounted on said sprung part for limiting movement of said arm in the opposite direction to said one direction and for defining the position of said leg relative to said arm when in said folded position, and a cam mounted on said leg for engagement with said stop, said cam being operative upon movement of said arm in said one direction to actuate said leg toward said normal position until past said overcenter position, and power means for actuating said arm.

8. In a load measuring brake equipment for a railway vehicle having an unsprung part and a load carrying sprung part, a load measuring mechanism carried by said sprung part and adapted to be moved in a certain direction into engagement with said unsprung part and comprising an arm rockably mounted at one end on said sprung part, a leg rockably mounted at one end on the opposite end of said arm and comprising a foot at its opposite end for engaging an under-surface of said unsprung part, resilient toggle means for holding said leg in a certain spread relation to said arm in a normal position, said toggle means having an overcenter position for urging said leg toward said arm, and cam means comprising a striking plate mounted on said sprung part and a wiping plate mounted on said leg for cooperative engagement with said striking plate, said cam means being operative upon movement of said mechanism in said certain direction to move said leg away from said arm past said overcenter position of said toggle means in a direction toward said normal position, and means for actuating said mechanism.

9. A measuring mechanism for a load compensating brake equipment for a railway vehicle having an unsprung part and a load carrying sprung part, comprising an arm rockably mounted at one end on said sprung part, a leg rockably mounted at one end on the opposite end of said arm and comprising at its opposite end a foot for engaging an undersurface of said unsprung part, resilient toggle means for holding said leg in a certain spread relation to said arm in a normal position, said toggle means having an overcenter position for urging said leg toward said arm, a striking plate for limiting movement of said arm relative to said sprung part and movement of said leg toward said arm, a wiping plate mounted on said leg for engagement with said striking plate, and means operative to rock said arm out of said normal position to carry said foot into engagement with said under-surface of said unsprung part, said means being operative when said toggle means is past said overcenter position for drawing said wiping plate over said striking plate and thereby actuating said leg back to said normal position.

10. A measuring mechanism for a load compensating brake equipment for a railway vehicle having an unsprung part and a load carrying sprung part comprising an arm rockably mounted at one end on said sprung part, a leg rockably mounted at one end on the opposite end of said arm and comprising at its opposite end a foot for engaging an under-surface of said unsprung part, said leg comprising two parts, one part connected to said arm and the other part carrying said foot and being adjustable relative to said one part in the direction of the length of said leg, a gage member pivotally mounted on said other part and movable manually relative to and with said leg to a gaging position for determining the length of said leg for a certain load condition, and friction means for resisting pivotal movement of said gaging member relative to said leg.

11. A measuring mechanism for a load compensating brake equipment for a railway vehicle having an unsprung part and a load carrying sprung part, comprising an arm rockably mounted at one end on said sprung part, a leg rockably mounted at one end on the opposite end of said arm and comprising a foot at its opposite end for engaging an under-surface of said unsprung part, resilient toggle means for holding said leg in a certain normal spread position relative to said arm, said toggle means having an overcenter position for urging said leg toward said arm, a striking plate rigidly mounted on said sprung portion for limiting downward movement of said arm and for defining movement of said leg toward said arm, a wiping plate mounted on said leg for engagement with said striking plate operative upon movement of said arm away from said striking plate to effect movement of said leg away from said arm through said overcenter position, and means for actuating said arm.

JOSEPH F. FROLA.

REFERENCES CITED

The following references are of record in the file of this patent:

UNITED STATES PATENTS

| Number | Name | Date |
| --- | --- | --- |
| 1,773,990 | Gerdes | Aug. 26, 1930 |
| 2,092,245 | Farmer | Sept. 7, 1937 |